United States Patent Office 3,336,216
Patented Aug. 15, 1967

3,336,216
CATALYTIC HYDROCRACKING PROCESS WITH A SILICA-MAGNESIA CRACKING BASE PROMOTED WITH NICKEL AND TUNGSTEN
John H. Taylor, Warton, near Preston, England, and Robert L. Jacobson, Pinole, Calif., assignors to Chevron Research Company, San Francisco, Calif., a corporation of Delaware
No Drawing. Filed Mar. 18, 1966, Ser. No. 535,363
3 Claims. (Cl. 208—110)

This application is a continuation-in-part of copending application Ser. No. 247,850, filed Dec. 28, 1962, now abandoned.

This invention relates to catalytic conversion processes, more particularly to a catalytic conversion process using a hydrocarbon conversion catalyst prepared in a novel manner, said catalyst being capable of converting petroleum distillates and residua into various valuable products, including middle distillates and gasoline, at a high ratio of middle distillates to gasoline.

The catalyst used in the process of the present invention is not as susceptible to nitrogen poisoning as are the more highly acidic catalysts conventionally used in hydrocracking service. The catalyst is especially useful in hydrocracking service for reasons including its lower nitrogen sensitivity than that of prior art hydrocracking catalysts employing conventional silica-alumina catalyst supports. The catalyst, prepared by certain novel calcination procedures, has a higher cracking activity in hydrocracking service and a higher denitrification rate constant in denitrification service than catalysts containing the same components that are not prepared by said novel calcination procedures. Still further, the catalyst is regenerable.

In accordance with the present invention there is provided a hydrocarbon conversion process which comprises converting a hydrocarbon feed selected from the group consisting of petroleum distillates and petroleum residua, by contacting said feed under hydrocracking conditions with a catalyst comprising silica-magnesia, nickel or a nickel compound, and tungsten or a tungsten compound, said catalyst being manufactured by steps including at least one step of impregnating calcined silica-magnesia particles with at least one metal compound selected from the group consisting of a compound of nickel and a compound of tungsten, drying said impregnated particles and calcining said impregnated and dried particles after at least one impregnation step to produce said catalyst, said calcining of said impregnated and dried particles being accomplished only in a temperature range of 600° to 750° F., preferably 650° to 750° F., more preferably 650° to 725° F., for a period of from 2 to 20 hours, preferably from 3 to 10 hours.

Further in accordance with the present invention there is provided a hydrocarbon conversion process which comprises contacting a hydrocarbon feed under hydrocracking conditions with a catalyst comprising silica-magnesia, nickel or a nickel compound, and tungsten or a tungsten compound, said catalyst being manufactured by steps comprising forming a silica-magnesia catalyst support, calcining said catalyst support at a temperature of from 500° to 1200° F. for a period of from 2 to 20 hours, impregnating said calcined support with a compound of nickel and a compound of tungsten in at least one impregnation step, drying said impregnated support after each impregnation step, calcining the impregnated and dried support after at least one sequence of impregnation and drying, and acomplishing each calcination of the impregnated and dried support only in a temperature range of 600° to 750° F., preferably 650° to 750° F., more preferably 650° to 725° F., for a period of from 2 to 20 hours, preferably from 3 to 10 hours.

Still further in accordance with the present invention there is provided a hydrocarbon conversion process which comprises contacting a hydrocarbon feed under hydrocracking conditions with a catalyst manufactured by steps comprising impregnating calcined silica-magnesia particles with a solution of a nickel salt, drying said impregnated particles, calcining said impregnated and dried particles, impregnating said impregnated, dried and calcined particles at least once with a solution containing a compound of tungsten, drying said particles after each impregnation with said solution containing a compound of tungsten, calcining the impregnated catalyst support after at least one sequence of tungsten compound impregnation and drying, and accomplishing each calcination step of impregnated and dried particles only in a temperature range of 600° to 750° F., preferably 650° to 750° F., more preferably 650° to 725° F., for a period of from 2 to 20 hours, preferably from 3 to 10 hours, whereby a final catalyst is produced having improved cracking activity and improved denitrification activity.

The compound of nickel and the compound of tungsten should be thermally decomposable to nickel oxide and tungsten oxide, respectively. Especially preferred nickel compounds are nickel salts, preferably nickel nitrate, nickel acetate and nickel carbonate. Especially preferred tungsten compounds are ammonium tungstate and tungstic acid.

Preferably, the silica-magnesia particles are calcined at from 500° to 1200° F. for a period of from 2 to 20 hours before any impregnation with a metal compound. This is particularly necessary where the silica-magnesia particles have been prepared by compressing silica-magnesia powder together with a conventional glue-type bonding and lubricant material; calcination of the resulting compressed product is necessary to burn out the glue-type bonding material to prepare the support for subsequent impregnation. The support may be a commercial support or one prepared by any conventional method. The size of the particles is not critical; they may be in the form of conventional pellets or extrudates, or may be of smaller size.

Preferably the calcined silica-magnesia particles are impregnated with a nickel compound, dried and calcined at 600° to 750° F. for 2 to 20 hours, thereafter impregnated with tungstic acid dissolved in a mixture of ammonia and water, and dried and calcined at 600° to 750° F. for 2 to 20 hours, with additional steps of tungsten compound impregnation, drying and calcining at 600° to 750° F. for 2 to 20 hours as necessary to produce a final catalyst composite with a sufficiently high tungsten compound content. It is within the scope of the present invention to use any number of steps of impregnation of nickel and tungsten compounds, in any order; an essential feature is that after the support has been impregnated with a metal compound at least once, subsequent calcination must be conducted at a temperature below 750° F.

Preferably, calcination is accomplished after each impregnation step. Those skilled in the art will recognize that, for example, unless nickel nitrate is converted to the oxide form by calcination prior to subsequent impregnation with a tungsten salt, unsatisfactory results may be obtained.

The catalyst used in the hydrocarbon conversion process of the present invention may contain tungsten or a compound thereof in an amount of from 1 to 40 weight percent, preferably from 2 to 25 weight percent, calculated as tungsten metal, based on the total catalyst composite; the nickel metal or compound thereof may be present in an amount of from 1 to 30 weight percent, preferably from 2 to 25 weight percent, calculated as nickel metal, based on the total catalyst composite. The magnesia content of the support may range from 5 to 75 weight percent of the silica-magnesia, preferably from 15 to 50 weight percent, and still more preferably from 20 to 35 weight percent.

The process of the present invention is carried out under conventional hydrocracking conditions, for example a temperature of about from 500° to 950° F., preferably from 650° to 850° F., a hydrogen partial pressure of from 500 to 3500 p.s.i.g., preferably 1000 to 2500 p.s.i.g., and a liquid hourly space velocity of from about 0.1 to 4.0, preferably from 0.4 to 2.0.

The following example sets forth the preferred method for manufacturing the catalyst used in the process of the present invention.

Example 1

A powdery silica-magnesia material containing about 28% magnesia is compressed, together with about 5% by weight of a conventional glue-type bonding and lubricant material used in catalyst preparation, into 3/16" x 3/16" pellets, and is calcined in air at 950° F. for six hours.

1000 cc. of the aforesaid calcined material are impregnated for four hours with 800 cc. of a solution of nickel nitrate containing 11.2 weight percent nickel, calculated as metal, and the impregnated material is dried for 24 hours at 250° F. and then calcined for four hours at 700° F. The resulting product is a catalyst support containing about 9 weight percent nickel, calculated as metal, in the form of nickel compounds, predominantly nickel oxide.

The aforesaid catalyst support is impregnated three times with separate 800 cc. portions of a solution consisting of 960 g. of tungstic acid ($H_2WO_4$) dissolved in a mixture of 1152 cc. of 30% ammonia ($NH_3$) and 3460 cc. of water. After each of the aforesaid impregnation treatments, the impregnated composite is dried at 250° F. for 20 hours, and calcined at 700° F. for four hours. The catalyst resulting from the foregoing operations contains 5.1 weight percent nickel, calculated as nickel metal, in the form of nickel compounds, predominantly nickel oxide, and 16.1 weight percent tungsten, calculated as tungsten metal, in the form of tungsten compounds, predominantly tungsten oxide, and has a nitrogen surface area of 331 m.²/g. When used to hydrocrack an Arabian gas oil feed at approximately 733° F. average catalyst temperature 2000 p.s.i.g. and 1.0 LHSV, the catalyst accomplishes a per-pass conversion of approximately 55% to products boiling below the initial boiling point of the feed. When used to denitrify a 550° to 850° F. Midway gas oil containing 2450 p.p.m. total nitrogen, at approximately 738° F. average catalyst temperature, 2000 p.s.i.g. and 0.77 LHSV, the catalyst accomplishes denitrification to an extent that the total nitrogen in the denitrified product is approximately 1 p.p.m.

Although the catalyst used in the process of the present invention may be used in the unsulfided form, the sulfided form is preferable. With feeds containing any substantial amounts of sulfur compounds, the catalyst automatically will tend to become sulfided on the surface under the operating conditions of the process. It is somewhat more preferable to presulfide the catalyst, by any conventional method, before placing it on stream.

The following table sets forth additional examples of preparation and use of the catalyst used in the process of the present invention, compared with preparation and use of similar catalysts prepared by other methods. In the table, the catalyst of Example 1 has been included as Catalyst No. 1. Catalysts Nos. 2, 3 and 4 also are catalysts used in the process of the present invention; Catalysts Nos. 5 through 10 are similar catalysts prepared by other methods. As will be seen from the table, these catalysts exhibit generally lower cracking activities than the catalysts used in the process of the present invention, and have lower denitrification activities.

| Cat. No. | Ni, Wt. Percent | W, Wt. Percent | Base Calcining | | Base Plus Metals Calcining | | $N_2$ Area, m.²/g. | Cracking Activity, Percent [1] | Total Nitrogen in Denitrified Gas Oil, p.p.m.[2] |
|---|---|---|---|---|---|---|---|---|---|
| | | | T., °F. | Hrs. | T., °F. | Hrs. | | | |
| 1 | 5.13 | 16.1 | 950 | 6 | 700 | 4 | 331 | 56 | 1.5 |
| 2 | 5.28 | 16.0 | 700 | 6 | 700 | 4 | 332 | 56 | 0.67 |
| 3 | 11.4 | 13.3 | 700 | 6 | 700 | 4 | 340 | 58 | |
| 4 | 12.1 | 8.3 | 700 | 6 | 700 | 4 | 373 | 57 | |
| 5 | 4.79 | 14.3 | 950 | 6 | 900 | 4 | 322 | 46 | 15.0 |
| 6 | 5.3 | 16.0 | 800 | 6 | 800 | 4 | 302 | 50 | 29.0 |
| 7 | 9.8 | 14.4 | 950 | 6 | 900 | 4 | 290 | 50 | 56 |
| 8 | 11.4 | 11.2 | 950 | 6 | 900 | 4 | 313 | 53 | 11 |
| 9 | 11.5 | 5.5 | 950 | 6 | 900 | 4 | 337 | 54 | 2.5 |
| 10 | 12.3 | | 950 | 6 | 900 | 4 | 394 | 42 | 320 |

[1] Percent per-pass conversion to products boiling below feed initial boiling point, when hydrocracking Arabian gas oil feed at 733° F. average catalyst temperature, 2,000 p.s.i.g., 1.0 LHSV.
[2] 550° to 850° F. Midway gas oil containing 2,450 p.p.m. total nitrogen, denitrified at 738° F. average catalyst temperature, 2,000 p.s.i.g., 0.77 LHSV.

What is claimed is:

1. A hydrocarbon conversion process which comprises converting a hydrocarbon feed selected from the group consisting of petroleum distillates and petroleum residua, by contacting said feed under hydrocracking conditions with a catalyst comprising nickel or a nickel compound, tungsten or a tungsten compound, and a cracking component consisting essentially of silica-magnesia, said catalyst being manufactured by steps including at least one step of impregnating calcined silica-magnesia particles with at least one metal compound selected from the group consisting of a compound of nickel and a compound of tungsten, drying said impregnated particles and calcining said impregnated and dried particles after at least one impregnation step to produce said catalyst, said calcining of said impregnated and dried particles being accomplished only in a temperature range of 600° to 750° F. for a period of from 2 to 20 hours.

2. A process as in claim 1 wherein said calcining of said impregnated and dried particles is accomplished at 650° to 725° F. for a period of from 3 to 10 hours.

3. A process as in claim 1, wherein the final catalyst composite contains from 1 to 40 weight percent of tungsten or a compound thereof, calculated as metal, from 1 to 30 weight percent of nickel or a compound thereof, calculated as metal, and said silica-magnesia support contains from 5 to 75 weight percent of magnesia.

References Cited

UNITED STATES PATENTS 3,078,221 2/1963 Beuther et al. _____ 208—111
3,213,012 10/1965 Kline et al. _____ 208—110

DELBERT E. GANTZ, *Primary Examiner.*

ABRAHAM RIMENS, *Examiner.*